United States Patent
Dittmer et al.

(10) Patent No.: US 7,137,739 B2
(45) Date of Patent: *Nov. 21, 2006

(54) HIGH PRESSURE BARRIER TO OIL LOSS BY DIFFUSION

(75) Inventors: Daniel D. Dittmer, Santa Cruz, CA (US); Alexander Parkhomovsky, Santa Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/356,128

(22) Filed: Feb. 17, 2006

(65) Prior Publication Data

US 2006/0140522 A1    Jun. 29, 2006

Related U.S. Application Data

(63) Continuation of application No. 10/699,316, filed on Oct. 31, 2003, now Pat. No. 7,001,074, and a continuation of application No. 10/662,426, filed on Sep. 16, 2003.

(60) Provisional application No. 60/464,482, filed on Apr. 21, 2003.

(51) Int. Cl.
*F16C 32/06* (2006.01)
*F16C 33/72* (2006.01)

(52) U.S. Cl. .................. 384/107; 384/124; 384/132

(58) Field of Classification Search ............... 384/100, 384/107, 114, 119, 124, 130, 132, 134; 310/90; 360/99.08, 98.07
See application file for complete search history.

(56) References Cited

U.S. PATENT DOCUMENTS

| | | |
|---|---|---|
| 4,132,414 A | 1/1979 | Dinsdale |
| 5,328,270 A | 7/1994 | Crawford |
| 5,347,189 A | 9/1994 | Chuta |
| 5,423,612 A | 6/1995 | Zang |
| 5,487,608 A | 1/1996 | Leuthold |
| 5,516,212 A | 5/1996 | Titcomb |
| 5,524,986 A | 6/1996 | Leuthold |
| 5,533,812 A | 7/1996 | Leuthold |

(Continued)

*Primary Examiner*—Thomas R. Hannon
(74) *Attorney, Agent, or Firm*—Morrison & Foerster LLP

(57) ABSTRACT

An improved rotational motor, such as a spindle motor for a disc drive, is provided. The motor first comprises a hub having a shaft portion and a horizontal body portion. The motor also comprises a sleeve surrounding the shaft portion of the hub. A fine vertical gap is retained between the shaft and the inner diameter of the surrounding sleeve. In addition, a fine horizontal gap is provided between the upper hub portion and the top of the sleeve. The vertical gap is filled with a lubricating liquid, such as a clean oil. A capillary seal is provided in the vertical fluid gap at one end. Preferably, the capillary seal is disposed at an upper end of the shaft proximal to the horizontal gap. Novel air pumping grooves are machined along the horizontal fluid gap. When the hub is rotated, the air pumping grooves create a high pressure region in the vicinity of the capillary seal. This forms a high pressure barrier that reduces the number of oil molecules diffusing out of the capillary seal and, therefore, inhibits oil loss from the system.

14 Claims, 7 Drawing Sheets

U.S. PATENT DOCUMENTS

| | | |
|---|---|---|
| 5,577,842 A | 11/1996 | Parsoneault |
| 5,601,125 A | 2/1997 | Parsoneault |
| 5,653,540 A | 8/1997 | Heine |
| 5,678,929 A | 10/1997 | Parsoneault |
| 5,685,647 A | 11/1997 | Leuthold |
| 5,716,141 A | 2/1998 | Chen |
| 5,793,129 A | 8/1998 | Parsoneault |
| 5,847,479 A | 12/1998 | Wang |
| 5,908,247 A | 6/1999 | Leuthold |
| 5,925,955 A | 7/1999 | Norris |
| 5,940,246 A | 8/1999 | Khan |
| 5,956,204 A | 9/1999 | Dunfield |
| 5,969,903 A | 10/1999 | Parsoneault |
| 5,977,674 A | 11/1999 | Leuthold |
| 5,980,113 A | 11/1999 | Grantz |
| 6,019,516 A | 2/2000 | Leuthold |
| 6,055,126 A | 4/2000 | Kennedy |
| 6,065,877 A | 5/2000 | Leuthold |
| 6,118,620 A | 9/2000 | Grantz |
| 6,137,650 A | 10/2000 | Heine |
| 6,144,523 A | 11/2000 | Murthy |
| 6,148,501 A | 11/2000 | Grantz |
| 6,149,159 A | 11/2000 | Kloeppel |
| 6,149,161 A | 11/2000 | Grantz |
| 6,183,135 B1 | 2/2001 | Kloeppel |
| 6,280,088 B1 | 8/2001 | Leuthold |
| 6,285,527 B1 | 9/2001 | Kennedy |
| 6,296,390 B1 | 10/2001 | Wolff |
| 6,296,391 B1 | 10/2001 | Hayakawa |
| 6,402,383 B1 | 6/2002 | Parsoneault |
| 6,575,634 B1 | 6/2003 | Nottingham |
| 6,583,952 B1 | 6/2003 | Grantz |
| 6,592,262 B1 | 7/2003 | Rahman |
| 6,594,883 B1 | 7/2003 | Kloeppel |
| 6,787,954 B1 | 9/2004 | Yoshitsugu |
| 6,982,510 B1 | 1/2006 | Aiello |
| 7,001,074 B1 * | 2/2006 | Dittmer et al. ............. 384/107 |

* cited by examiner ( KNOWN )

HIGH PRESSURE BARRIER TO OIL LOSS BY DIFFUSION

REFERENCE TO RELATED APPLICATIONS

This application is a continuation of U.S. application Ser. No. 10/662,426, filed Sep. 16, 2003, which claims priority from U.S. Provisional Application No. 60/464,482, filed Apr. 21, 2003, the contents of which are hereby incorporated herein by reference.

BACKGROUND OF THE INVENTION

1. Field of the Invention

The present invention relates to fluid dynamic bearing motors. More specifically, the present invention pertains to fluid dynamic bearing motors such as are used to support and rotationally drive one or more memory discs.

2. Description of the Related Art

The computer industry employs magnetic discs for the purpose of storing information. This information may be stored and later retrieved using a disc drive system. Computer systems employ disc drive systems for transferring and storing large amounts of data between magnetic discs and the host computer. The magnetic discs are typically circular in shape (though other shapes are known), and are comprised of concentric, or sometimes spiraled, memory tracks. Each track contains magnetic data. Transitions in the magnetic data are sensed by a magnetic transducer known as a read/write head. The transducer is part of the disc drive system, and moves radially over the surface of the disc to read and/or write magnetic data.

FIG. 1 presents a perspective view of magnetic media 10 as are commonly employed for information storage. In this view, a plurality of stacked magnetic discs 10' is shown. The discs 10' in FIG. 1 are shown in vertical alignment as is common within a disc drive system. Each disc 10 has a central concentric opening 5 for receiving a spindle (shown at 51 in FIG. 2). A rotary motor drives the spindle 51, causing the discs 10 of the disc pack 10' to rotate in unison.

In operation, information stored in the magnetic layer of the disc 10 is read by a magnetic head assembly. The magnetic head assembly is part of a disc drive system, such as the system 50 shown in FIG. 2. FIG. 2 presents a top view of an exemplary disc drive system 50, with the magnetic head assembly seen at 58. The disc drive assembly 50 includes a servo spindle 52 and an actuator arm 54. The servo spindle 52 is motorized to pivot about an axis 40. More specifically, the servo spindle 52 is selectively positioned by a voice coil motor 57 which pivots the actuator arm 54, causing the arm 54 to move through arc 42. In this manner, the arm 54 can be positioned over any radial location "R" along the rotating disc surface.

The actuator arm 54 carries a flexure arm or "suspension arm" 56. The suspension arm 56, in turn, supports the magnetic head assembly 58 adjacent a surface of a disc 10. The head assembly 58 defines a transducer that is capable of reading magnetic information from the magnetic layer of the disc 10, or writing additional information on a reserved portion of the disc 10. The magnetic head 58 is typically placed on a small ceramic block, also referred to as a slider. The slider is aerodynamically designed so that it "flies" over the disc 10 as the disc is rotated at a high rate of speed.

As noted, the disc 10 itself is supported on a drive spindle 51. The drive spindle 51 rotates the disc 10 relative to the magnetic head assembly 58. FIG. 3 provides a perspective view of a disc drive assembly 50. In this arrangement, a plurality of discs 10' are stacked vertically within the assembly 50, permitting additional data to be stored, read and written. The drive spindle 51 receives the central openings 5 of the respective discs 10. Separate suspension arms 56 and corresponding magnetic head assemblies 58 reside above each of the discs 10. The assembly 50 includes a cover 30 and an intermediate seal 32 for providing an air-tight system. The seal 32 and cover 30 are shown exploded away from the disc stack 10' for clarity.

In operation, the discs 10 are rotated at high speeds about axis 45 (seen in FIG. 2). As the discs 10 rotate, the air bearing slider on the head 58 causes the magnetic head 58 to be suspended relative to the rotating disc 10. The flying height of the magnetic head assembly 58 above the disc 10 is a function of the speed of rotation of the disc 10, the aerodynamic lift properties of the slider along the magnetic head assembly 58 and, in some arrangements, a biasing spring tension in the suspension arm 56.

Each disc 10 has a landing zone 11 where the magnetic head assembly 58 lands and rests when the disc drive 50 is turned off. When the disc drive assembly 50 is turned on, the magnetic head 58 "takes off" from the landing zone 11. Each disc 10 also has a data zone 17 where the magnetic head 58 flies to magnetically store or read data.

As noted, the servo spindle 52 pivots about pivot axis 40. As the servo spindle 52 pivots, the magnetic head assembly 58 mounted at the tip of its suspension arm 56 swings through arc 42. This pivoting motion allows the magnetic head 58 to change track positions on the disc 10. The ability of the magnetic head 58 to move along the surface of the disc 10 allows it to read data residing in tracks along the magnetic layer 15 of the disc. Each read/write head 58 generates or senses electromagnetic fields or magnetic encodings in the tracks of the magnetic disc as areas of magnetic flux. The presence or absence of flux reversals in the electromagnetic fields represents the data stored on the disc.

In order to accomplish the needed rotation of discs, an electric motor is provided. The electric motor is commonly referred to as a "spindle motor" by virtue of the drive spindle 51, or "hub," that closely receives the central opening 5 of a disc 10. FIG. 4 illustrates the basic elements of a known spindle motor design, in cross-section. The motor 400 first comprises a hub 410. The hub 410 includes an outer radial shoulder 412 for receiving a disc (not shown in FIG. 4). The hub 410 also includes an inner shaft 414. In this arrangement, the shaft 414 resides and rotates on a stable counterplate 440. A sleeve 420 is provided along the outer diameter of the shaft 414 to provide lateral support to the shaft 414 while it is rotated.

It can be seen that a bearing surface 422, or "journal surface," is formed between the shaft 410 and the surrounding sleeve 420. In early arrangements, one or more ball bearing systems (not shown was incorporated into the hub 410 to aid in rotation. Typically, one of the bearings would be located near the top of the shaft, and the other near the bottom. A raceway would be formed in either the shaft or the sleeve for holding the plurality of ball bearings. The bearings, in turn, would be lubricated by grease or oil. However, various shortcomings were realized from the mechanical bearing system, particularly as the dimensions of the spindle motor and the disc tracks became smaller. In this respect, mechanical bearings are not always scaleable to smaller dimensions. More significantly, in some conditions ball bearings generate unwanted vibrations in the motor assembly, causing the read/write head to become misaligned over the tracks. Still further, there is potential for leakage of grease or oil into the atmosphere of the disc drive, or outgassing of the components into this atmosphere.

In response to these problems, hydrodynamic, bearing spindle systems have been developed. In these types of systems, lubricating fluid is placed along bearing surfaces defined around the rotating spindle/hub. The fluid may be in the form of gas, such as air. Air is popular because it avoids the potential for outgassing of contaminants into the sealed area of the head disc housing. However, air cannot provide the lubricating qualities of oil or the load capacity. Further, its low viscosity requires smaller bearing gaps and, therefore, higher tolerance standards to achieve similar dynamic performance. As an alternative, fluid in liquid form has been used. Examples include oil and ferro-magnetic fluids. A drawback to the use of liquid is that the liquid lubricant should be sealed within the bearing to avoid leakage. Any loss in fluid volume results in a reduced bearing load capacity and life for the motor. In this respect, the physical surfaces of the spindle and of the housing would come into contact with one another, leading to accelerated wear and eventual failure of the bearing system.

Returning back to FIG. 4, the motor 400 of FIG. 4 represents a hydrodynamic bearing system. A thrust plate 430 is disposed between the shaft 414 and the surrounding sleeve 420. Fluid is injected in gaps maintained between the shaft 414 and surrounding parts, e.g., the counterplate 440, the sleeve 420, and the thrust plate 430. The fluid defines a thin fluid film that cushions relative movement of hub parts.

The motor 400 is actuated by energizing coils in a stator in cooperation with one or more magnets. In the view of FIG. 4, magnets 450 are seen disposed within the hub 410, while stator coils 452 are provided on a base 460. The magnets 450 and stator coils 452 interact to provide rotational movement of the hub 410.

Additional details of fluid dynamic bearing systems are provided in U.S. patent application Ser. No. 10/099,205 filed Mar. 13, 2002, and entitled "Low Power Fluid Dynamic Bearing." That application is commonly owned with the present application, and is incorporated herein in its entirety by reference. Of interest, that application presents various hydrodynamic motor designs wherein a thrust plate 430 is not employed.

As noted, it is important to retain fluid within the bearing surfaces for a hydrodynamically operated spindle motor. Various architectures have been proposed for retaining fluid within the bearing surfaces. Certain patents present a mechanical seal. For example, U.S. Pat. No. 5,347,189 entitled "Spindle Motor with Labyrinth Sealed Bearing" provides a labyrinth seal outside one of the bearings. The labyrinth seal has two parts that mate to form a tortuous flow path for fluids. This serves to inhibit the escape of grease from ball bearings. U.S. Pat. No. 5,925,955 entitled "Labyrinth Seal System" provides an alternative seal system for an electronic spindle motor.

Other patents provide for a grooved pattern that serves to, retain fluid within a spindle motor. U.S. Pat. No. 6,149,159 entitled "High Pressure Boundary Seal" provides for a "herringbone pattern" of grooves along or adjacent the outer surface of the shaft. A zone of high pressure is created at or about the center of the pattern, thereby creating a high pressure boundary seal. This, in turn, prevents the flow of lubricating fluid from the interior of the motor or the bearing into the interior section of the disc drive housing. Another example is U.S. Pat. No. 5,533,812 entitled "Single Plate Hydrodynamic Bearing with Self-Balanced Fluid Level," which offers a thrust plate having grooved surfaces.

Still another means for retaining fluid within a hydrodynamically operated bearing surface for a spindle motor is presented in U.S. Pat. No. 5,524,986. This patent is entitled "Fluid Retention Principles for Hydrodynamic Bearings." A flexible membrane is provided at one end of the fluid gap. The spring force of the membrane allows the gap volume to adjust with fluid changes as temperature fluctuates. In this respect, the membrane is flexible, and absorbs any increase in volume of the bearing fluid. The '986 patent also introduces the principle of a capillary seal. In this respect, a capillary seal is provided at one end of the gap. The capillary seal design helps retain a volume of lubricant oil within the system necessary for continuous motor operation.

One problem presented with the capillary seal design is that an end of the bearing gap is exposed to the ambient environment of the disc drive housing. This, in turn, can lead to a slow but progressive oil loss by evaporation. The lubricant oil is selected to have a low vapor pressure to reduce evaporation. Nevertheless, over the life of the motor a noticeable amount of lubricant is lost from the capillary seal by evaporation, as well as from vapor diffusion in the gas phase.

To compensate for the oil loss, the capillary seal dimensions are designed to hold a larger amount of oil than would otherwise be necessary. However, the available reservoir volume is limited by geometrical size constraints and by requirements for seal splash robustness during shock events.

Thus, a need exists for an improved fluid dynamic bearing system for a spindle motor that retains liquid within and along the bearing surfaces. Further, there is a need for such a motor that minimizes oil loss due to evaporation. Still further, there is a need for such a motor that minimizes the amount of oil that is lost from the capillary seal over the life of the motor.

SUMMARY OF THE INVENTION

The present invention provides an improved motor arrangement. The arrangement is useful in connection with rotary electrical motors, such as spindle motors in disc drive systems. More specifically, the invention is most applicable to motors that employ fluid dynamic bearing surfaces between relatively rotating parts.

In an exemplary arrangement, the improved spindle motor first comprises a hub having a shaft portion and an upper horizontal body portion. The motor also comprises a sleeve surrounding the shaft portion of the hub. A first fine gap is retained between the shaft and the inner diameter of the surrounding sleeve. In addition, a second fine gap is provided between the upper hub portion and the top of the sleeve. The first gap typically is substantially vertical, and is filled with a lubricating liquid, such as a clean oil. The second gap is typically horizontal. However, the present invention is intended to cover any relative angle between the first and second gaps.

A capillary seal is provided in the vertical fluid gap at one end. Preferably, the capillary seal is disposed at an upper end of the shaft proximal to the upper hub portion. In addition, air pumping grooves are machined along the horizontal fluid gap. The air pumping grooves may be machined into the bottom of the upper hub portion; preferably, though, they are machined into the top of the sleeve. The air pumping grooves are used to create a high pressure region in the vicinity of the capillary seal. In this respect, the high pressure barrier reduces the number of oil molecules diffusing out of the capillary seal and, therefore, the total oil loss from the system.

BRIEF DESCRIPTION OF THE DRAWINGS

So that the manner in which the above recited features of the present invention can be understood in detail, a more particular description of the invention, briefly summarized above, may be had by reference to the appended drawings. It is to be noted, however, that the appended drawings (FIGS. 5–8) illustrate only typical embodiments of this invention and are therefore not to be considered limiting of its scope.

DETAILED DESCRIPTION OF THE INVENTION

The present invention provides an improved spindle motor arrangement. The improved motor employs novel air pumping grooves as a means for retaining liquid lubricant within a fluid bearing interface.

Figure 1:
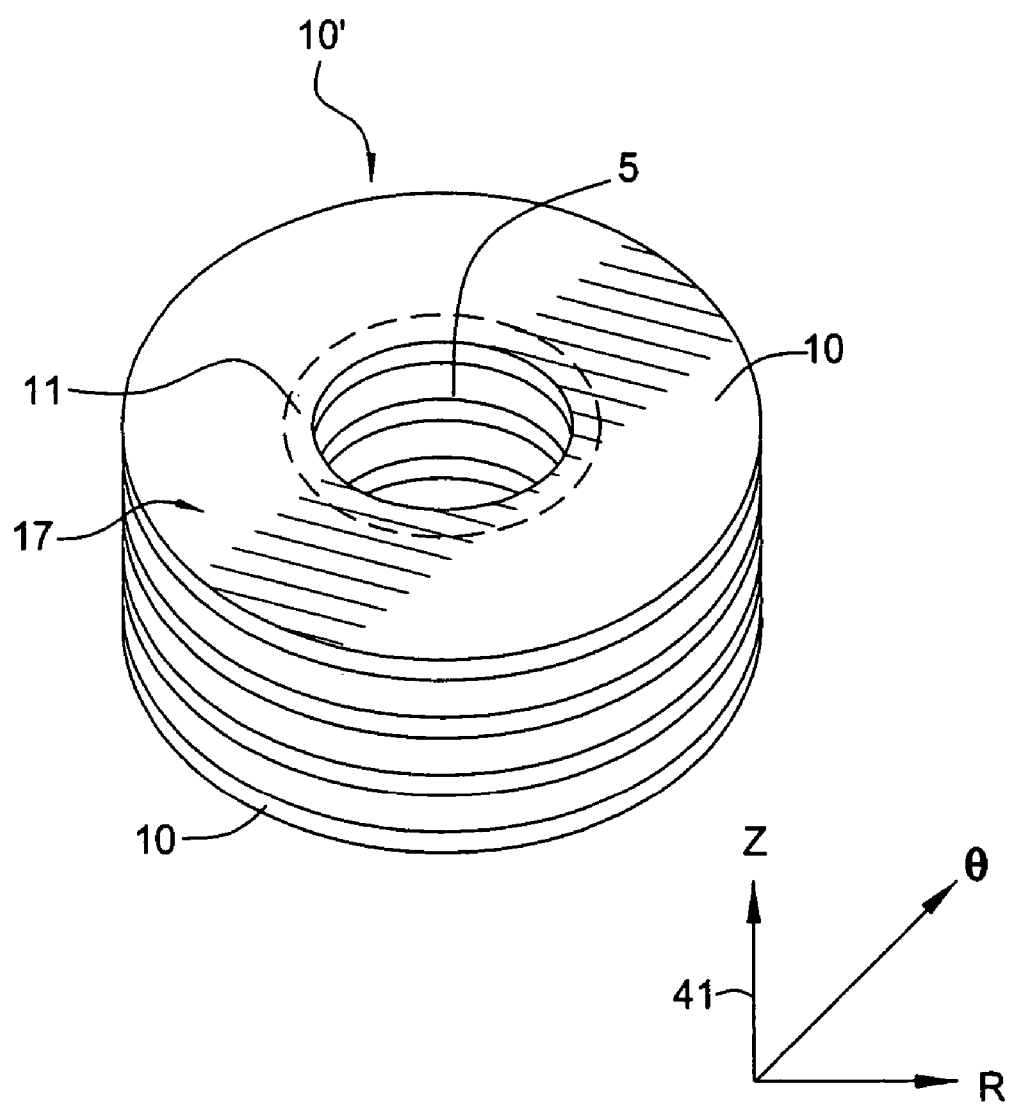
FIG. 1 demonstrates a perspective view of magnetic media, i.e., thin film magnetic discs, as are commonly employed for information storage. In this view, a plurality of stacked discs is shown.
Figure 2:
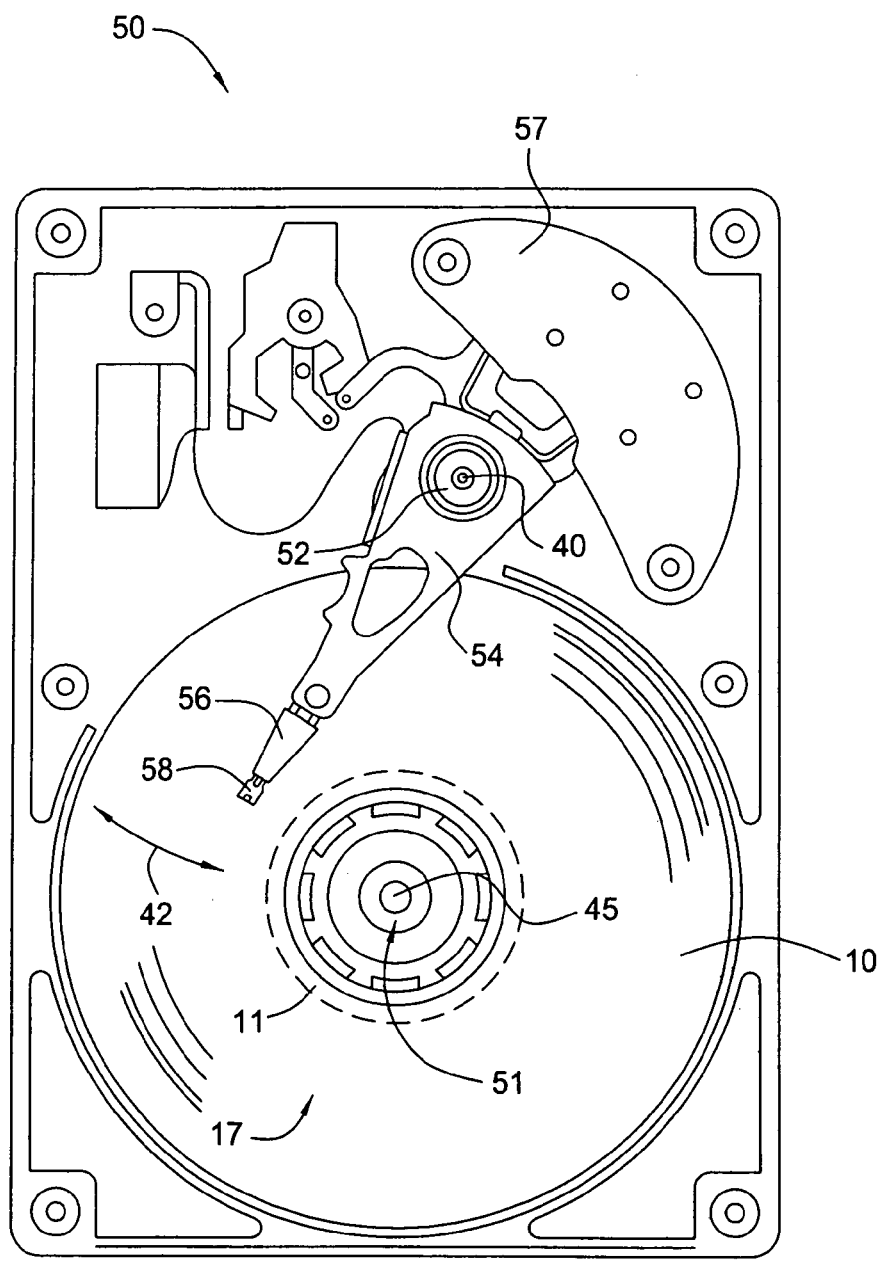
FIG. 2 presents a top view of an exemplary disc drive assembly.
Figure 2:
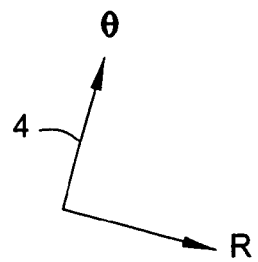
Figure 3:
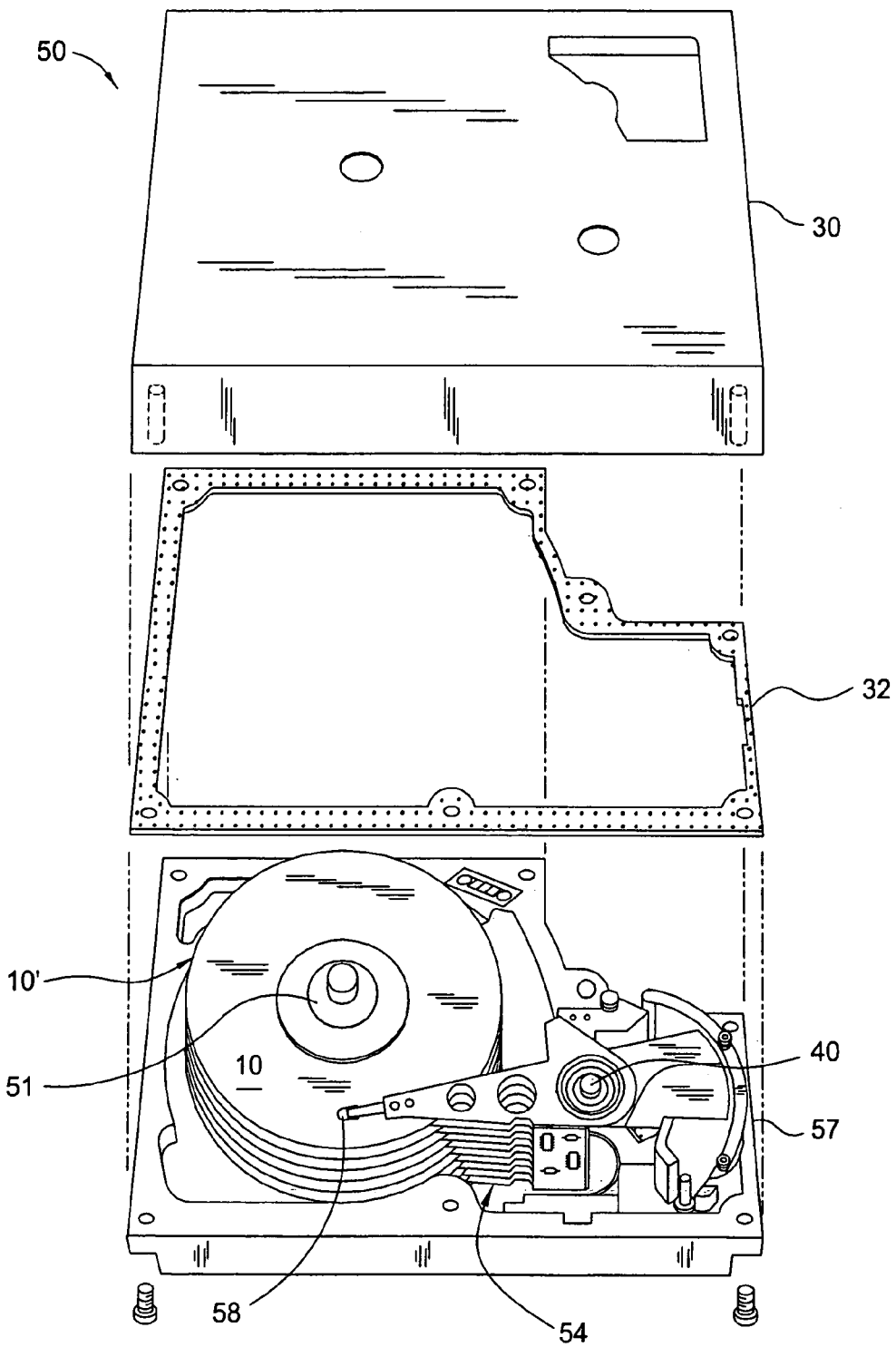
FIG. 3 illustrates a perspective view of an exemplary disc drive assembly as might employ the improved spindle motor arrangement of the present invention.
Figure 4:
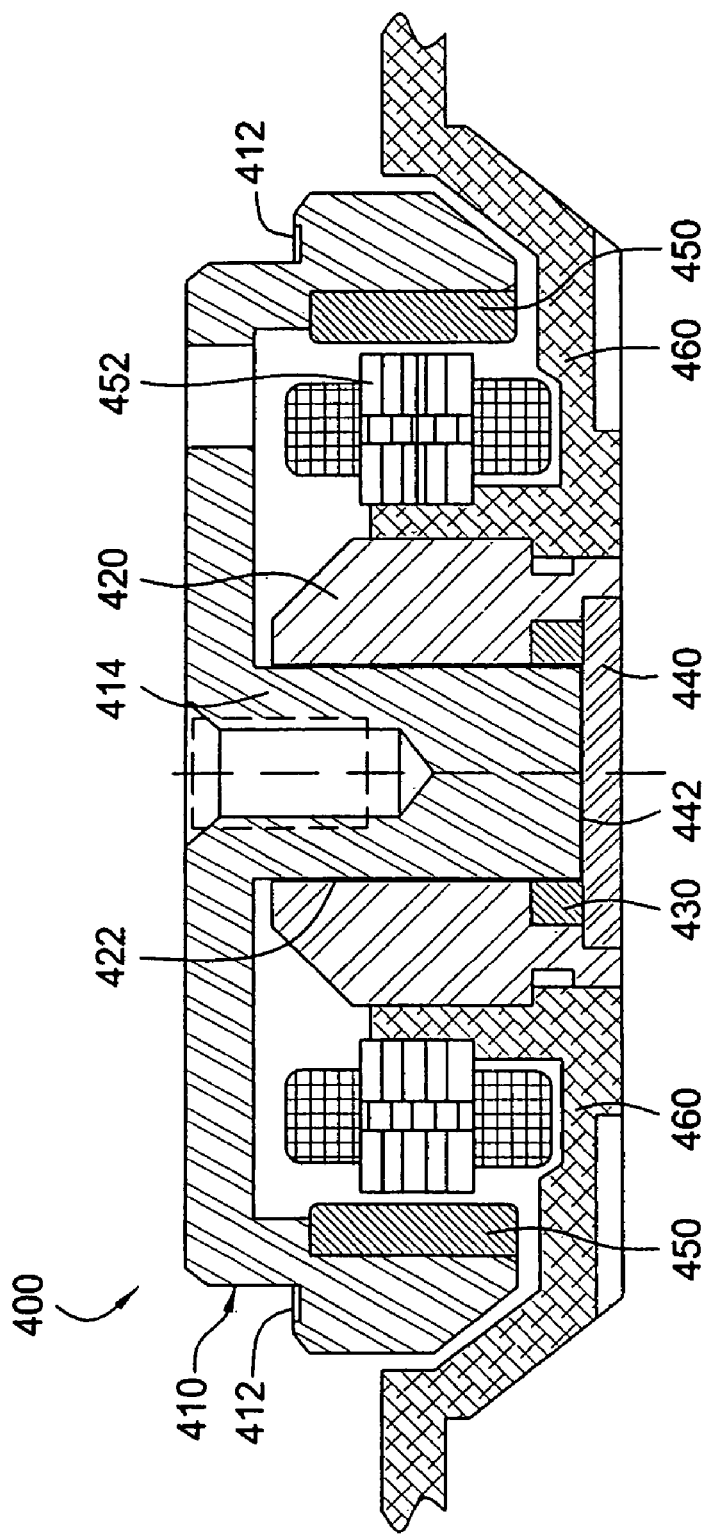
FIG. 4 provides a cross-sectional view of a hydrodynamic bearing spindle motor arrangement known as of the present filing.
Figure 5:
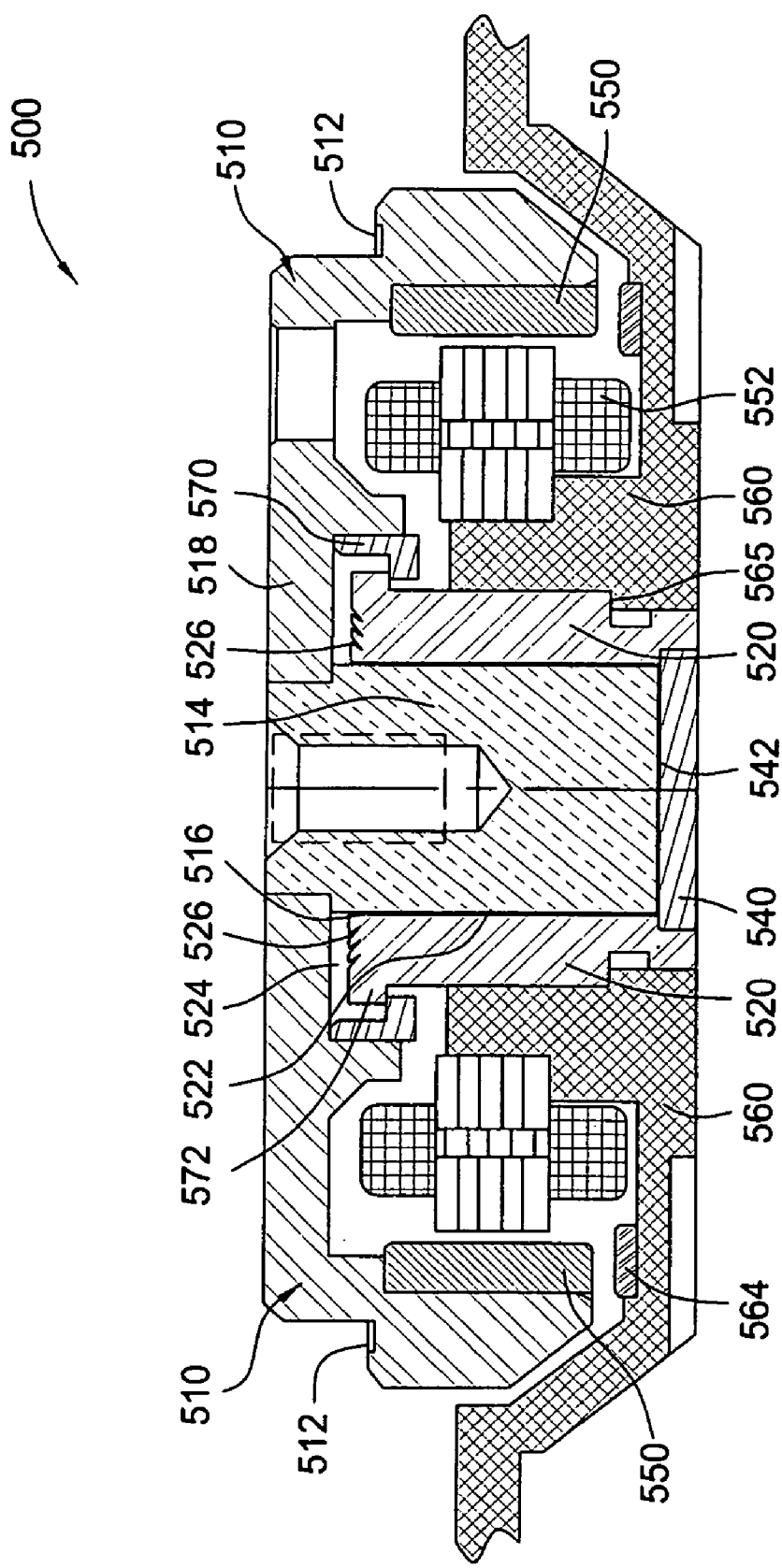
FIG. 5 presents a cross-sectional view of an improved spindle motor arrangement in which air pumping grooves are machined.

FIG. 5 presents a cross-sectional view of an improved spindle motor arrangement 500 in one embodiment in which air pumping grooves 526 are machined. The motor 500 first comprises a hub 510. The hub 510 provides a radial shoulder 512 for receiving and supporting a body to be rotated, such as a magnetic disc (not shown). The hub 510 defines a central shaft portion 514 and a horizontal body portion 518. The shaft 514 is configured for constant high speed rotation. This rotation is established by a stator 552 which is mounted from a base 560. The stator 552 defines an electric coil that, when energized, creates a magnetic field. The energized coil cooperates with magnets 550 mounted from the inner surface of the hub 510 to generate rotational movement of the hub 510.

As noted, the shaft 514 is configured for high speed rotation. In this respect, the shaft 514 rotates over a stationary counterplate 540. The interface between the bottom of the shaft 514 and the top of the counterplate 540 thus defines a thrust bearing 542. Fluid such as liquid lubricant is maintained along the thrust bearing gap 542 to provide a fluid bearing surface. One of the top face of the counterplate 540 or the bottom surface of the shaft 514 includes a grooved pattern (seen at 544 in the enlarged view of FIG. 6). The grooved pattern assists in maintaining fluid between the shaft 514 and the counterplate 540 when the shaft 514 rotates. When the motor 500 is at rest, the shaft 514 presses directly on the counterplate 540. Fluid is then at least partially pressed into the grooves 544, and also extruded around the outer diameter of the shaft 514.

The motor 500 of FIG. 5 next comprises a sleeve 520. In the arrangement of FIG. 5, the sleeve 520 is stationary and is supported on the counterplate 540. The sleeve 520 is disposed between the rotating shaft 514 and shoulder 565 of the surrounding base 560. It can be seen that the interface between the rotating shaft 514 and the surrounding sleeve defines a fluid bearing surface 522. When the motor 500 is energized and the shaft 514 and connected hub 510 are rotated, lubricant is drawn downward from the sleeve bearing surface 522 into the thrust bearing surface 542. Lubricating fluid is drawn into the thrust bearing gap 542 under the urging of the grooved pattern 544. More specifically, the lubricating fluid is drawn into the thrust bearing region 542 to support relative rotation between the bottom end of the shaft 514 and the facing surface of the counterplate 540, the fluid being maintained in part in the gap 542 by the grooved pattern during rotation. When the shaft 514 comes to rest, the shaft end will rest on the plate 540 and, although the volume of fluid is very small, it will tend to be forced back out into the sleeve bearing gap 522 between the shaft 514 and the sleeve 520. Therefore, space is preferably allowed in this gap 522 for this fluid.

To prevent the shaft 514 and connected hub 510 from being displaced axially too far above the counterplate 540, since this is an axially upward thrust bearing 542 between the shaft end and the counterplate 540, an opposing bias is typically introduced. This bias is utilized to prevent the thrust bearing gap 542 from becoming too large, which would reduce the effectiveness of the motor 500. Approaches to this can be seen in the provision of a biasing magnet 564 facing the motor magnet 550 and axially spaced therefrom. By selecting a suitable size and location for this magnet 564, an appropriate bias against the shaft 514 being axially displaced too far from the counterplate 540 or the base 560 can be optionally introduced.

In the arrangement of FIG. 5, the fluid gap 522 between the shaft 514 and the inner diameter of the surrounding sleeve 520 is essentially vertical. At the same time, the fluid gap 524 between the upper hub portion 518 and the top of the sleeve 520 is essentially horizontal. However, the present invention is intended to cover any orientation and relative angle between the first 522 and second 524 gaps.

To inhibit the loss of liquid lubricant from the bearing gaps 542, 522 during operation, a capillary seal 516 is provided at the distal end of the sleeve bearing gap 522 from the thrust bearing gap 542. Further information concerning operation of a capillary seal within a bearing gap is disclosed in U.S. Pat. No. 5,524,986 entitled "Fluid Retention Principles for Hydrodynamic Bearings." That patent issued to Seagate Technologies, Inc. in 1996.

To further inhibit the loss of fluid such as liquid lubricant from the bearing gaps 542, 522, particularly during operation of the motor 500, novel pumping grooves 526 are provided. The pumping grooves 526 are positioned along an upper gap 524 between the horizontal body portion 518 of the hub 510 and the sleeve 520. The pumping grooves 526 may be disposed along the surface of either the horizontal body portion 518 of the hub 510 or the sleeve 520. Preferably, the grooves 526 are placed along the sleeve 520. The pumping grooves pump fluid such as air.

Figure 6:
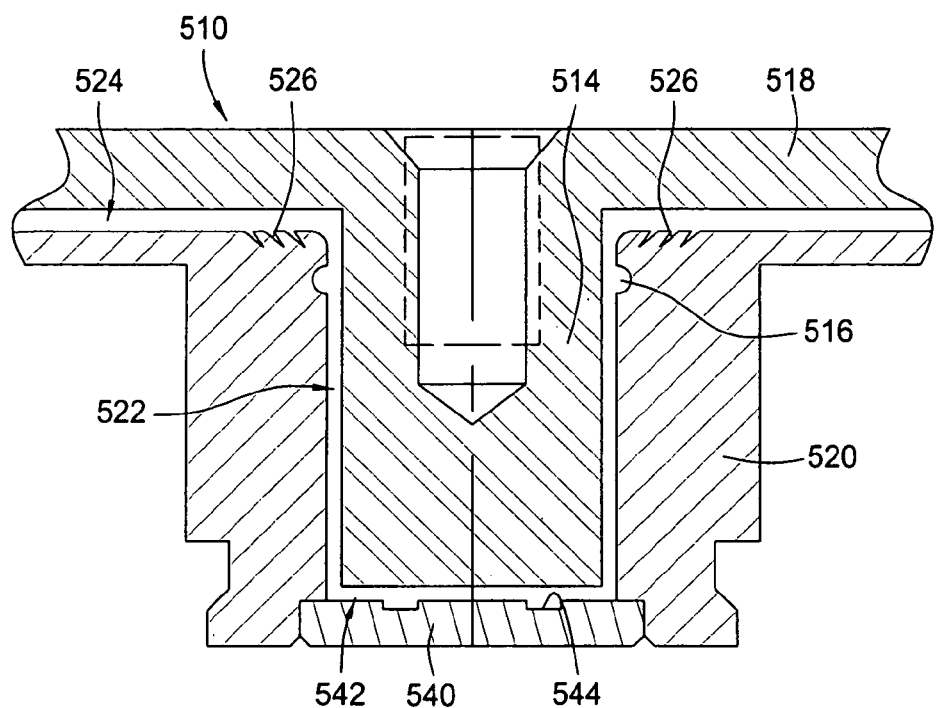
FIG. 6 illustrates an enlarged view of the gaps formed between the shaft of the spindle motor of FIG. 5, and the surrounding sleeve. Here, the grooves are provided on an upper surface of the sleeve.

FIG. 6 illustrates an enlarged view of gaps 522 and 524 formed between the hub 510 and the surrounding sleeve 520. More specifically, gap 522 is formed between the shaft portion 514 of the hub 510 and the sleeve 520, while gap 524 is formed between the top of the sleeve 520 and the lower surface of the central body portion 518 of the hub 510. In this enlarged view, the capillary seal 516 can be seen in the sleeve bearing gap 522. In addition, air pumping grooves 526 can be seen on a top surface of the sleeve 520. The air pumping grooves 526 serve to inhibit the evaporation of oil. Operation of this inhibitor phenomenon is as follows.

When oil evaporates from the capillary seal 516 in a spindle motor, an oil vapor is released. This may occur during idle periods; however, it may also occur following periods of use when the overall motor system 500 heats up. As the temperature of the lubricating fluid, e.g., oil, rises, the lubricating fluid volume begins to expand. Ultimately, some oil begins to transition to gas phase and diffuses outward past the capillary seal 516. The resulting oil vapor typically saturates the region of the bearing gap 522 closest to the seal 516. Given enough time to reach equilibrium, the entire volume around the seal 516 will become saturated with oil vapor unless the diffusion of molecules is not limited by tight gaps, or if the gap volume is too large to become fully saturated. An undesirable oil loss occurs when oil molecules migrate past the capillary seal region 516 and do not return.

An increase in air pressure in the volume adjacent to the capillary seal 516 will decrease the rate of oil molecule transfer to the outside of the capillary seal region 516. Therefore, the rate of oil evaporation from the motor 500 can be reduced by using a "pump" to pressurize the region adjacent to the capillary seal 516. The issue then becomes one of creating a pumping arrangement to increase air pressure along the gap 524 adjacent the capillary seal 516.

Figure 8:
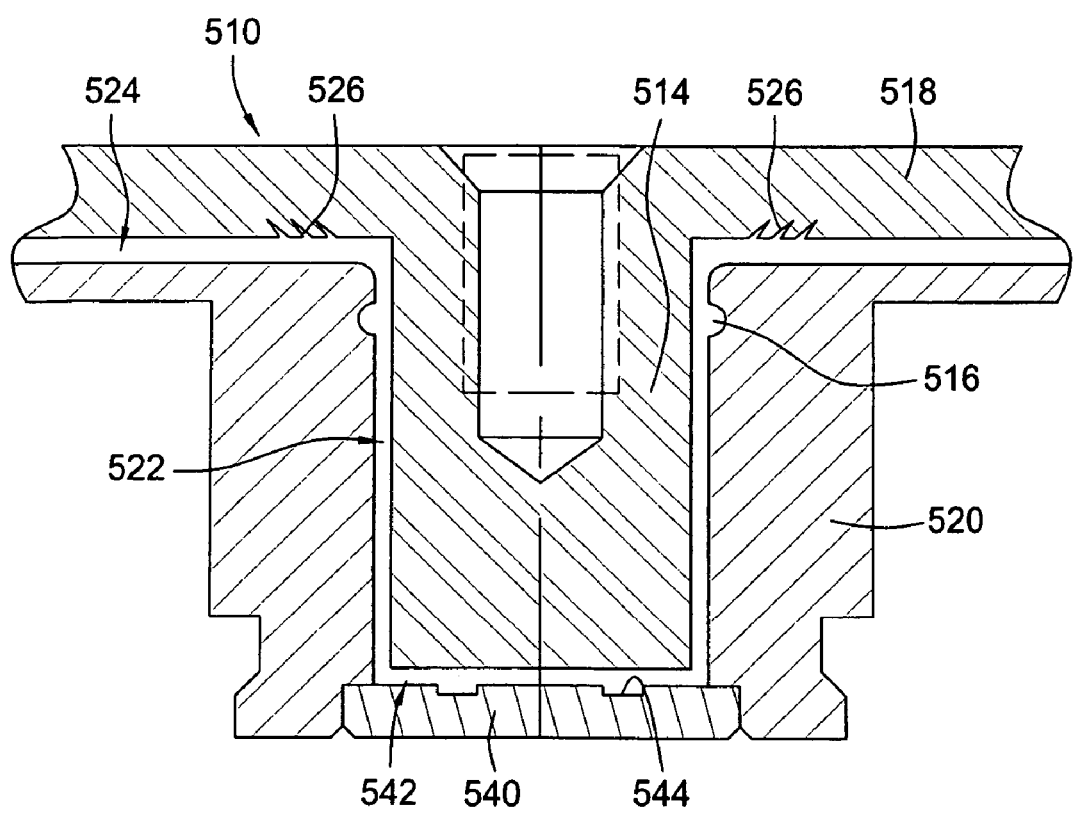
FIG. 8 provides an enlarged cross-sectional view of the gaps formed between the shaft of the spindle motor of FIG. 5, and the surrounding sleeve, in an alternate embodiment. Here, the air pumping grooves are disposed along the underside of the hub.

According to the present invention, such a pump can be created by placing grooves in a tight gap region adjacent the capillary seal 516. This is provided by placing the novel air pumping grooves 526 between the hub 518 and sleeve 520 or other motor component near the capillary seal 516. In one arrangement, the grooves 526 are disposed along the bottom of the central hub portion 518 on a side of the capillary seal 516 opposite the counterplate 540 (see FIG. 8). In another embodiment, and as shown in FIG. 6, the grooves 526 may be disposed along the top surface of the sleeve 520, also on a side of the capillary seal 516 opposite the counterplate 540. In one embodiment, the horizontal gap 524 is approximately 0.16 millimeters in height. In one embodiment, a portion of the motor surfaces on top of the sleeve 520 and under the hub 518 along the horizontal gap 524 are pre-coated with a fluid repelling coating.

The groove pattern 526 is configured so that air flow is guided into the capillary seal area 516 when the hub 510 is rotated. An example of such a pattern is a spiral pattern machined into the top of the sleeve 520. However, any type of pattern as is used to draw air in a tight gap region is suitable to serve as the air pumping groove.

Figure 7:
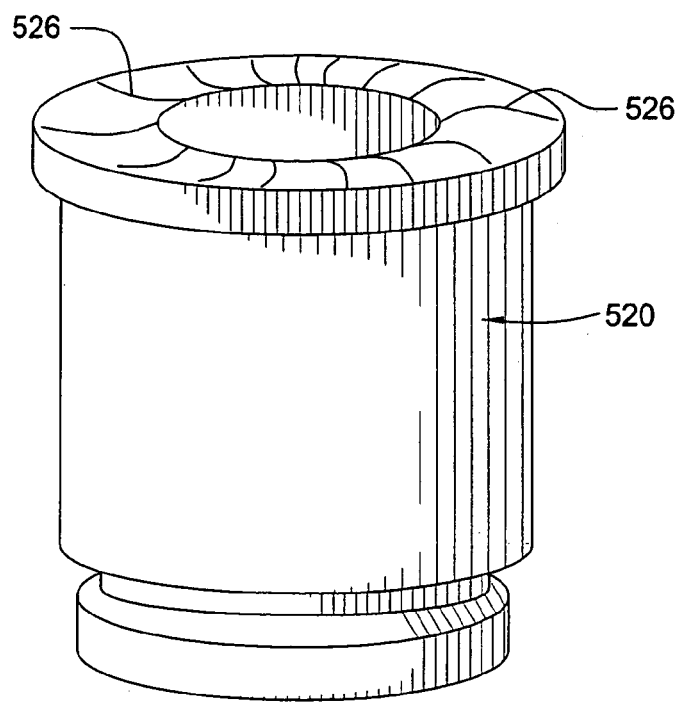
FIG. 7 depicts a perspective view of an exemplary sleeve having air pumping grooves, in one embodiment.

FIG. 7 depicts a perspective view of an exemplary sleeve 520 having air pumping grooves 526, in one embodiment. Preferably, the groove pattern 526 is spaced apart from the formed fluid meniscus of the capillary seal 516 and is not pre-coated in oil. As the sleeve 520 and the hub 510 rotate relative to one another, air is introduced by operation of the groove pattern, e.g., pattern 526, in order to produce a high pressure region. Air is introduced into the upper gap region 524 between the horizontal hub portion 518 and the sleeve 520. This produces a high pressure region along the capillary seal 516 opposite the bearing surfaces 522, 542. As the total pressure in the system is increased, there is a corresponding reduction of the gas phase diffusion coefficient of the oil through the reduction of the mean free path of the oil molecules. (This applies over a range of temperatures in the system, brought into the steady state condition with respect to oil diffusivity. This, in turn, reduces evaporation loss.

The diffusion of oil into the vapor phase is a function of the mean free path of the oil molecules in the gas phase versus the mean velocity of the oil molecules in the air. The general function is as follows:

$$D = f(\lambda_{mfp}, \bar{v}) \quad (1)$$

The relationship can be mathematically defined. In the ideal gas approximation which can be applied in the range of pressures under consideration in the capillary seal system, the diffusion coefficient of the oil vapor is directly proportional to the mean free path of the oil molecules in the gas phase:

$$D_{oil} = \frac{1}{3} \lambda_{mfp} \bar{v} \quad (2)$$

where $\lambda_{mfp}$ is the mean free path of the oil molecules in the vapor phase; and $\bar{v}$ is the mean velocity of the oil molecules in the gas phase.

The mean free path, $\lambda_{mfp}$, is proportional to system parameters, as follows:

$$\lambda_{mfp} \propto \frac{kT}{p\sigma\sqrt{2}} \quad (3)$$

where k is the Boltzman gas constant;

T is the temperature in the system; and

σ is the molecular cross section of the oil.

Thus, pressurizing the capillary seal region by a certain factor will decrease the oil diffusion through air by the same factor.

The invention claimed is:

1. A fluid dynamic bearing defined by an interface of a hub and a sleeve, the hub comprising a shaft portion configured to rotate within the sleeve and a body portion configured to rotate above the sleeve, the bearing comprising:
   a gap region between the hub and the sleeve;
   a capillary seal within the gap;
   a volume of lubricating fluid within the gap; and
   an air pumping groove pattern disposed in the gap, the air pumping groove pattern forming a high air pressure region in the gap when the shaft portion of the hub is rotated within the sleeve, wherein the air pumping groove pattern defines at least one groove formed in a top surface of the sleeve or the air pumping groove pattern defines at least one groove formed in a bottom surface of the body portion of the hub.

2. The fluid dynamic bearing of claim 1, wherein the hub further comprises a radial shoulder for receiving a disc.

3. The fluid dynamic bearing of claim 1, wherein the shaft portion is adapted to rotate within the sleeve on a counterplate.

4. The fluid dynamic bearing of claim 1, wherein the air pumping groove pattern defines a spiral pattern.

5. A spindle motor of a disc drive, the spindle motor comprising a sleeve and a hub rotating relative to the sleeve, the hub having a shaft portion configured to rotate within the sleeve and a body portion configured to rotate above the sleeve, and the spindle motor having a bearing surface defined by the interface of the hub and the sleeve, wherein the bearing surface comprises:
- a gap region between the hub and the sleeve;
- a capillary seal within the gap;
- a volume of lubricating fluid within the gap; and
- an air pumping groove pattern disposed in the gap, the air pumping groove pattern forming a high air pressure region in the gap when the shaft portion of the hub is rotated within the sleeve, wherein the air pumping groove pattern defines at least one groove formed in a top surface of the sleeve or the air pumping groove pattern defines at least one groove formed in a bottom surface of the body portion of the hub.

6. The spindle motor of claim 5, wherein the hub further comprises a radial shoulder for receiving a disc.

7. The spindle motor of claim 5, wherein:
the shaft portion is adapted to rotate within the sleeve on a counterplate; and the lubricating fluid is oil.

8. The fluid dynamic bearing of claim 5, wherein the air pumping groove pattern defines a spiral pattern.

9. The fluid dynamic bearing of claim 8, wherein the spiral pattern is formed in a top surface of the sleeve.

10. The fluid dynamic bearing of claim 5, wherein at least a portion of opposing hub and sleeve surfaces along the gap are coated with a non-moisturizing substance.

11. A disc drive storage system, comprising:
a disc,
a head moveable over the disc,
a spindle motor,
the spindle motor comprising a sleeve and a hub rotating relative to the sleeve, the hub having a shaft portion configured to rotate within the sleeve and a body portion configured to rotate above the sleeve, the hub configured to receive and support the disc, and the spindle motor having a bearing surface defined by the interface of the hub and the sleeve, wherein the bearing surface comprises:
- a gap region between the hub and the sleeve;
- a capillary seal within the gap;
- a volume of lubricating fluid within the gap; and
- an air pumping groove pattern disposed in the gap, the air pumping groove pattern forming a high air pressure region in the gap when the shaft portion of the hub is rotated within the sleeve, wherein the air pumping groove pattern defines at least one groove formed in a top surface of the sleeve or the air pumping groove pattern defines at least one groove formed in a bottom surface of the body portion of the hub.

12. The disc drive storage system of claim 11, wherein the hub further comprises a radial shoulder for receiving a disc.

13. The disc drive storage system of claim 11, wherein:
the shaft portion is adapted to rotate within the sleeve on a counterplate; and the lubricating fluid is oil.

14. The disc drive storage system of claim 11, wherein the air pumping groove pattern defines a spiral pattern.

* * * * *